US008655154B2

(12) United States Patent
Moore et al.

(10) Patent No.: US 8,655,154 B2
(45) Date of Patent: Feb. 18, 2014

(54) TELEVISION SIGNAL RECORDING

(75) Inventors: Nigel Stuart Moore, Newbury (GB);
Martin Selby George, Alton (GB);
Nicolas Pierre Rose, Basingstoke (GB)

(73) Assignee: Sony United Kingdom Limited,
Weybridge (GB)

( * ) Notice: Subject to any disclaimer, the term of this patent is extended or adjusted under 35 U.S.C. 154(b) by 669 days.

(21) Appl. No.: 12/756,710

(22) Filed: Apr. 8, 2010

(65) Prior Publication Data

US 2010/0260475 A1 Oct. 14, 2010

Related U.S. Application Data

(63) Continuation-in-part of application No. 12/138,058, filed on Jun. 12, 2008, now abandoned.

(30) Foreign Application Priority Data

Jun. 12, 2007 (GB) .................................. 0711351.7

(51) Int. Cl.
*H04N 5/76* (2006.01)
(52) U.S. Cl.
USPC ........... 386/297; 386/243; 386/291; 348/726; 715/719; 725/40
(58) Field of Classification Search
USPC ................... 386/243, 291; 348/726; 715/719; 725/40
See application file for complete search history.

(56) References Cited

U.S. PATENT DOCUMENTS

| 6,788,882 B1 | 9/2004 | Geer et al. |
| 2003/0177495 A1 | 9/2003 | Needham et al. |
| 2006/0051058 A1 | 3/2006 | Rudolph et al. |
| 2006/0083483 A1 | 4/2006 | Suzuki |
| 2006/0222329 A1* | 10/2006 | Sano ................................ 386/83 |
| 2007/0192793 A1* | 8/2007 | Song et al. ....................... 725/39 |
| 2009/0165045 A1* | 6/2009 | Stallings et al. ................. 725/39 |

FOREIGN PATENT DOCUMENTS

| EP | 1763237 A2 | 3/2007 |
| JP | 2001-186472 A | 7/2001 |
| JP | 2003-110987 A | 4/2003 |
| WO | WO 96/19779 A1 | 6/1996 |
| WO | WO 98/12872 A1 | 3/1998 |
| WO | WO 02/25936 A2 | 3/2002 |
| WO | WO 03/067594 A1 | 8/2003 |

* cited by examiner

*Primary Examiner* — Thai Tran
*Assistant Examiner* — Girumsew Wendmagegn
(74) *Attorney, Agent, or Firm* — Oblon, Spivak, McClelland, Maier & Neustadt, L.L.P.

(57) ABSTRACT

A television signal recording apparatus comprises a recording unit that makes recordings of television signals and stores metadata representing information in respect of the recordings including the channel and the recording time. A graphical display of made recordings and scheduled recordings is produced in which graphical objects representing respective recordings are arranged in two dimensions, ordered in a first dimension on the basis of the channels and ordered in a second dimension on the basis of the recording times. In the second dimension, the graphical objects are arranged along a time axis which includes discontinuities at times when no recording is present, the discontinuities being graphically represented by graphical symbols that are different according to the period of the discontinuity. An electronic program guide is produced with a similar format, the programs being filtered to select programs and discontinuities being present at times where there is no selected program.

36 Claims, 3 Drawing Sheets

TELEVISION SIGNAL RECORDING

CROSS-REFERENCE TO RELATED APPLICATIONS

This application is a continuation-in-part of and claims the benefit of priority under 35 USC §120 from U.S. application Ser. No. 12/138,058, filed Jun. 12, 2008, and claims the benefit of priority under 35 USC §119 from the U.K. patent Application No. GB0711351.7, filed Jun. 12, 2007, the entire contents of each of which is incorporated herein by reference.

BACKGROUND OF THE INVENTION (1) Field of the Invention

The present invention relates to digital television and in particular to a television signal recording apparatus capable of making recordings of television signals and to a receiver-decoder apparatus capable of receiving and decoding a television signal.

(2) Description of Related Art

In particular the present invention is concerned with the user interface for such a television signal recording apparatus or receiver-decoder apparatus. The user interface is provided to allow the user to control the operation of the television signal recording apparatus. Numerous aspects of the operation are typically so controlled, notably in the case of a television signal recording apparatus the control of the recording itself and in the case of a receiver-decoder apparatus the control of the reception and decoding of the television signal.

One of the difficulties faced is allowing the user to appreciate what recordings have been made. As the technology of television signal recording apparatuses improves, for example with the use of high capacity storage media such as hard disk drives, increasing numbers of recordings are being made. This can result in the television signal recording apparatus storing large numbers of recordings. The user typically will not have knowledge of all the recordings. The recordings may have been made automatically or by other users, or may simply have been forgotten. This fundamentally affects the use of the television signal recording apparatus. In the absence of knowledge of a given recording, the user can fail to watch a recording that would otherwise be desired.

BRIEF SUMMARY OF THE INVENTION

The first aspect of the present invention is concerned with this aspect of the user interface.

According to a first aspect of the present invention, there is provided a television signal recording apparatus comprising:

a recording unit capable of making recordings of television signals, the television signal recording apparatus being arranged to store metadata representing information in respect of the recordings including the channel from which the recording was made and the recording time at which the recording was made; and a recordings display generator arranged to generate a signal for display on a display device of a graphical display of the recordings, the graphical display comprising graphical objects representing respective recordings and arranged in two dimensions, the graphical objects being ordered in a first dimension on the basis of the channels represented by the metadata in respect of the respective recordings and ordered in a second dimension on the basis of the recording times represented by the metadata in respect of the respective recordings, along a time axis which includes discontinuities at times when no recording has been made, the discontinuities being graphically represented.

Further according to the first aspect of the present invention, there is provided a corresponding method of operating a television signal recording apparatus.

Thus a graphical display representing the recordings is provided. In the graphical display, the graphical objects representing respective recordings are arranged in two dimensions on the basis of the channels of the recordings and recording times of the recordings. The channels and recording times are extracted from the metadata stored in respect of the recordings.

As a result of the two-dimensional representation of the recordings, the user is better able to appreciate precisely what recordings have been made and hence are available for watching. As the recordings are sorted by channel in one dimension and time in another dimension, the user is able to understand better what recordings are present. This improves the operation of the television signal recording apparatus because the user has a better chance of locating a preferred recording for viewing.

Another, similar difficulty faced is allowing the user to appreciate what recordings have been scheduled. Typically the television signal recording apparatus will include a recordings controller arranged to maintain a list of scheduled recordings scheduled to be recorded at respective times and to operate the recording unit to record the recordings at the scheduled times. However, as the technology of television signal recording apparatuses improves, for example with the use of high capacity storage media such as hard disk drives, increasing numbers of recordings are being made. This can result in the television signal recording apparatus the recording list containing large numbers of recordings scheduled to be made. This in turn can make it difficult for the user to manage the recordings. Consequently the user may have difficulties such as failing to record desired programs.

Furthermore, in the graphical display, the graphical objects representing respective recordings are arranged along a time axis. Discontinuities at times when no recording is scheduled to be made are graphically represented. As a result of the representation of discontinuities, the user is better able to appreciate precisely what recordings have been made. This is because the user can appreciate where recordings have been made at separated times. Consequently the operation of the television signal recording apparatus is improved because the user is better able to manage the recording of multiple recordings.

In some embodiments, the discontinuities are graphically represented by a graphical symbol positioned between graphical objects representing respective recordings, which graphical symbols are different according to the period of the discontinuity. As a result of, the user is better able to appreciate precisely what recordings have been made, because the user can appreciate the period of the discontinuities. Consequently the operation of the television signal recording apparatus is improved because the user is better able to manage the recording of multiple recordings.

The second aspect of the present invention is concerned with this aspect of the user interface.

According to a second aspect of the present invention, there is provided a television signal recording apparatus comprising:

a recording unit capable of making recordings of television signals;

a recordings controller arranged to maintain a list of scheduled recordings scheduled to be recorded at respective times and to operate the recording unit to record the recordings at the scheduled times; and a recordings display generator arranged to generate a signal for display on a display device of a graphical display of the scheduled recordings, the graphical display comprising graphical objects representing respective scheduled recordings and arranged, on the basis of their respective times, along a time axis which includes discontinuities at times when no recording is scheduled to be made, the discontinuities being graphically represented.

Further according to the second aspect of the present invention, there is provided a corresponding method of operating a television signal recording apparatus.

Thus a graphical display representing the scheduled recordings is provided. In the graphical display, the graphical objects representing respective recordings are arranged along a time axis. Discontinuities at times when no recording is scheduled to be made are graphically represented. As a result of the representation of discontinuities, the user is better able to appreciate precisely what recordings have been scheduled. This is because the user can appreciate where recordings have been scheduled at separated times. This is particularly advantageous, for example, to illustrate the scheduling of a series of recordings which are related, but has general benefit for any type of recordings. Consequently the operation of the television signal recording apparatus is improved because the user is better able to manage the recording of multiple recordings.

In some embodiments, the discontinuities are graphically represented by a graphical symbol positioned between graphical objects representing respective recordings, which graphical symbols are different according to the period of the discontinuity. As a result of, the user is better able to appreciate precisely what recordings have been scheduled, because the user can appreciate the period of the discontinuities. Consequently the operation of the television signal recording apparatus is improved because the user is better able to manage the recording of multiple recordings.

Another difficulties faced is allowing the user to appreciate what programs are scheduled to be broadcast. The numbers of channels and programs available for watching is now high. In principle this gives a user great choice, but in practice it can be very common for a user to fail to notice a program that would be desired to be watched or recorded. This fundamentally affects the use of a receiver-decoder apparatus. To inform the user about programs scheduled to be broadcast, there are used electronic program guides generated by the receiver-decoder apparatus from signalling data transmitted as part of the broadcast television signal. Such an electronic program guide typically comprises graphical objects representing the selected programs arranged along a time axis for each channel. However the shear number of programs on multiple channels can still make it difficult for a user to identify a program of interest.

The third aspect of the present invention is concerned with this aspect of the user interface.

According to a third aspect of the present invention, there is provided a receiver-decoder apparatus comprising:

a receiver-decoder circuit capable of receiving and decoding broadcast television signals of different services to generate therefrom a video signal for display of an image on a display device; and an EPG generator operative to extract signalling data from the broadcast television signal received by the receiver-decoder circuit, the signalling data indicating programs scheduled to be broadcast, the EPG generator being operative to filter the programs scheduled to be broadcast to select programs meeting a predetermined criteria and to generate a signal for display on said display device of an electronic program guide comprising graphical objects representing the selected programs arranged along a time axis which includes discontinuities at times when no selected program is scheduled to be broadcast, the discontinuities being graphically represented by a graphical symbol positioned between graphical objects representing respective recordings, said graphical symbols being different according to the period of the discontinuity.

Further according to the third aspect of the present invention, there is provided a corresponding method of operating a television signal recording apparatus.

Thus the electronic program guide can be filtered. This allows programs to be selected according to some criteria, for example whether the program falls within a predetermined genre. In the displayed electronic program guide, the graphical objects representing respective recordings are arranged along a time axis. Discontinuities at times when program is selected are graphically represented by a graphical symbol positioned between graphical objects representing respective recordings, which graphical symbols are different according to the period of the discontinuity. As a result, the user is better able to appreciate precisely the nature and timings of the programs selected according to the criteria used in the filtering. This is because the user can appreciate where programs are available at separated times and what the length of the separation is. This is particularly advantageous, for example, to illustrate the scheduling of a series of programs which are related, but has general benefit for any type of recordings. Consequently the operation of the television signal recording apparatus is improved because the user is better able to select programs for reception and/or recording.

DETAILED DESCRIPTION OF THE INVENTION

Embodiments of the present invention will now be described by way of non-limitative example with reference to the accompanying drawings.

Figure 1:
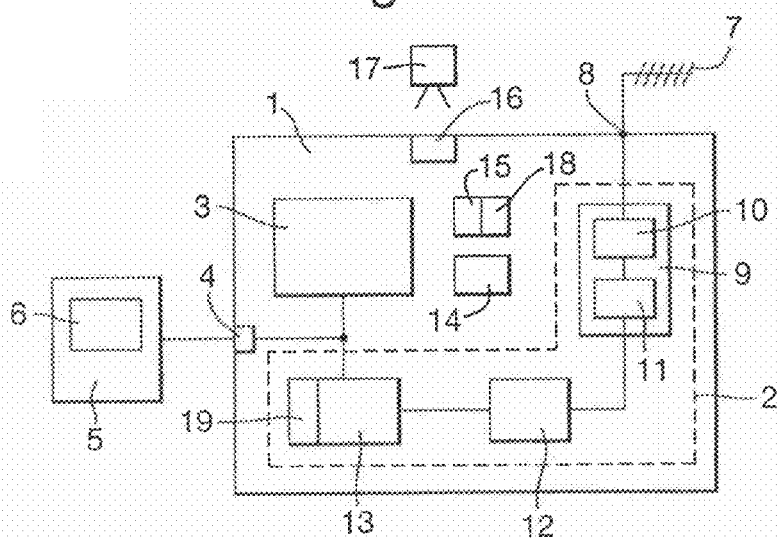
FIG. 1 is a diagram of a recording apparatus.

FIG. 1 shows a recording apparatus 1 comprising a receiver-decoder circuit 2 capable of receiving and decoding broadcast television signals in accordance with the DVB standards and a recording unit 3 capable of making recordings of the decoded television signals. The decoded television signals may also be supplied to an output interface 4 for supply to a television apparatus 5 which displays an image on a display device 6. As an alternative, the display device 6 could be integrated in the recording apparatus 1.

Optionally, the recording apparatus 1 may include plural receiver-decoder circuits 2 able to simultaneously receive and decode different broadcast television signals.

The recording unit 3 may be of any type and capable of making recordings on any type of storage medium which may be integral or replaceable. Typically the recording unit 3 will be a hard drive that is integral to the apparatus or a drive for recording on an optical or magneto-optical recording medium such as a DVD. Alternative recording media such as semiconductor memory may also be used.

The receiver-decoder circuit 2 is arranged to receive broadcast television signals in accordance with the DVB standard. The nature of these broadcast television signals will be now described.

According to the DVB standard, what a user might normally call a "channel" is known as a "service". For example, in the United Kingdom, BBC1 would be one service and BBC2 would be another service. Also according to the DVB standard, what a user might normally call a "program" is known as an "event". These occupy individual time slots within a service. For example, in the UK, an episode of the news program "Newsnight" would be one event and an episode of the soap opera "Eastenders" would represent another event. Each service is therefore a concatenation of television events.

According to the DVB standard, the broadcast television signal comprises a stream of packets of data multiplexed together and carried modulated onto a radio frequency (RF) carrier signal in a single RF channel. The stream is sometimes referred to as a channel because it corresponds to a transmission channel, although the invention is defined with reference to a "channel" using the term as commonly understood by the user to cover generically a series of events or programs.

The stream contains packets of video signal data, packets of audio signal data and packets of signalling data. Each packet of signalling data is associated with a particular table, the arrangement and content of which is in accordance with those defined in EN 300 468.

As defined in ISO/IEC 13818-1 and EN 300 468, each of the signalling data packets has a packet identifier (PID) which designates it as a packet of signalling data, rather than a packet of audio or visual data. The signalling data is arranged in packets, and each packet of signalling data is associated with a particular table, the arrangement and content of which is in accordance with those defined in ISO/IEC 13818-1 and EN 300 468. Each signalling data packet has a table identifier, which designates which table the packet belongs to. Each signalling data packet also contains a "payload", which contains data about, for example, the network, the services and/or the events. The precise items of data that are stored in a packet depend on which table the packet belongs to, and details of which items of data are given in packets belonging to a particular table can be found in ISO/IEC 13818-1 and EN 300 468. For present purposes it is noted that the signalling data includes the EPG signalling data which can be extracted for use as the content of an EPG, including:

a Service Description Table (SDT) which gives information on services which are being transmitted, including the names of the services; and an Event Information Table (EIT) which gives information on the events in respect of each service, including the names and times of the respective events.

The receiver-decoder circuit 2 of the recording apparatus 1 will now be described in detail. In this example, the broadcast digital television signal is a terrestrial signal transmitted on a radio frequency (RF) carrier. The recording apparatus 1 is connected to an external antenna 7 through a connector 8 in a conventional manner.

The receiver-decoder circuit 2 comprises a receiver circuit 9 to which the RF television broadcast signal received by the antenna 7 is supplied. The receiver circuit 9 comprises an RF tuner 10 which extracts the desired broadcast signal and a demodulator 11 which demodulates the broadcast signal to extract a multiplexed signal of a single broadcast channel.

As is conventional for broadcast digital television, each broadcast channel carries a multiplexed signal in which a plurality of video streams and associated audio and data streams, commonly referred to as services, are multiplexed together. The video stream extracted by the demodulator 11 is supplied to a demultiplexer 12. The demultiplexer 12 demultiplexes the packets of data in the video stream to extract one or more video signals, one or more audio signals and signalling data.

The video signal extracted by the demultiplexer 12 is supplied to a decoder 13 for decoding the video stream in accordance with the MPEG-2 standard. The decoder 13 outputs an uncompressed video signal which is output as the output of the receiver-decoder circuit 2.

As an alternative, the receiver-decoder circuit 2 may be absent from the recording apparatus 1. In this case an equivalent receiver-decoder circuit is implemented in a separate apparatus such as a set-top box, and the received, decoded television signal is supplied to the recording apparatus 1.

The recording apparatus 1 includes a controller 14 which controls the operation of the components of the recording apparatus 1. For example, the controller 14 controls the receiver-decoder circuit 2 to select the broadcast video signal of a desired service and controls the recording operation of the recording unit 3 to selectively record the television signal output by the receiver-decoder circuit 2.

The controller 14 is implemented by a microprocessor running an appropriate computer program. The controller 14 has associated therewith a RAM 15 and a non-volatile memory 18 such as a flash memory. The computer program may be stored in the recording unit 3 or the non-volatile memory 18. The computer program may be pre-installed or may be transmitted to the recording apparatus 1 as a broadcast signal, this being a known technique for upgrading of software of a television receiving equipment.

The recording apparatus 1 also has an IR (infra-red) receiver unit 16 capable of receiving signals from a remote commander 17. The remote commander 17 is operated by a user to provide user-inputs to the recording apparatus 1.

The decoder 13 includes a graphics generator 19. The controller 14 controls the graphics generator 19 to generate a video signal representing screens as part of a user interface. The user interface screens may be superimposed on or mixed with the video signal output by the decoder 13, so that they are displayed on the display device 6 of the television apparatus 5. The user operates the remote commander 17 based on the user interface screens. The controller 14 is responsive to the user-inputs from the remote commander 17 to control the operation of the recording apparatus 1.

As part of the user interface, the controller 14 generates and causes display of an electronic program guide (EPG). The content of the EPG in respect of the broadcast television signals which may be received by the receiver-decoder circuit 2 is derived from the EPG signalling data output by the demultiplexer 12. The controller 14 extracts this EPG signalling data from the signalling data packets output by the demultiplexer 12 and uses it to populate the EPG. Thus the EPG includes a list of services available for reception by the receiver-decoder circuit 2 and events in respect of those services. The controller 14 stores data representing the EPG in the memory 15.

Figure 3:
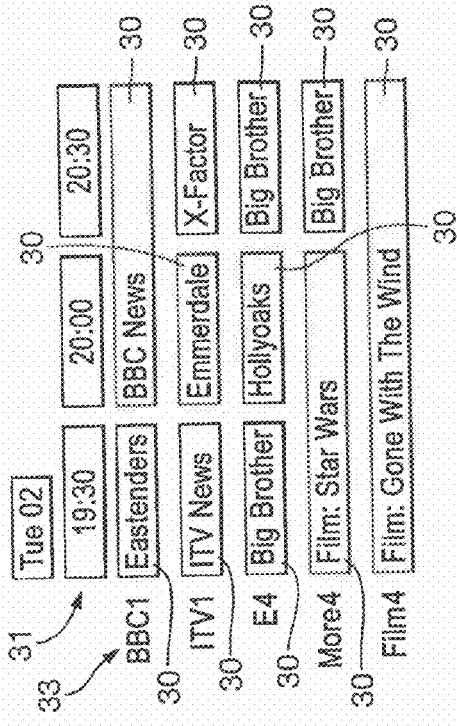
FIG. 3 is a picture of a displayed electronic program guide.

In response to a user-input from the remote commander 17 selecting the EPG, the controller 14 controls the graphics generator 19 to generate a video signal representing the EPG stored in the memory 15 as a type of user interface screen. An example of an EPG as displayed is shown in FIG. 3. The individual programs are represented by rectangular blocks 30, although in general any other graphical object could be used. The blocks contain the name of the program. The blocks 30 are arranged in two dimensions.

In a first dimension (horizontally in FIG. 3), the blocks 30 are ordered on the basis of the times at which the programs are scheduled to be broadcast. The time axis is indicated by a scale 31 displayed graphically along the top of the display. In this example the scale 31 specifies the date and specifies the time in half-hourly chunks, but in general the time axis could be displayed in any suitable manner.

In a second dimension (vertically in FIG. 3), the blocks 30 are ordered on the basis of the channel of the recording represented thereby. The channels are identified by display of the names 33 of each channel. The channels may be all available channels or may be a set of one or more channels selected by the user as favorite channels.

The controller 14 allows the user to navigate the EPG and to select individual services and events. The controller 14 accepts user-inputs indicating events in the EPG selected by the user for recording. In response to such user-inputs, the controller 14 controls the operation of the recording apparatus 1 at the time of the event to cause the receiver-decoder circuit 2 to receive and decode the event and optionally also to cause the recording unit 3 to record the event.

The controller 14 also allows the EPG to be filtered in response to a corresponding user-input. In this case the programs in the EPG are filtered to select programs according to a particular criteria. Any suitable criteria may be applied. One possible criteria is whether the programs are in a given genre or category, e.g. soap operas, news programs, sports programs, news, drama, children's programs, movies, etc. Such genre information may be obtained in respect of the programs as part of the signalling data. Another possible criteria is whether a keyword or set of keywords is present. Another possible criteria is whether The user may select the criteria which is applied, e.g. from a displayed list.

The controller 14 controls the graphics generator 19 to generate a video signal representing the filtered EPG in which only the selected programs are shown.

Figure 4:
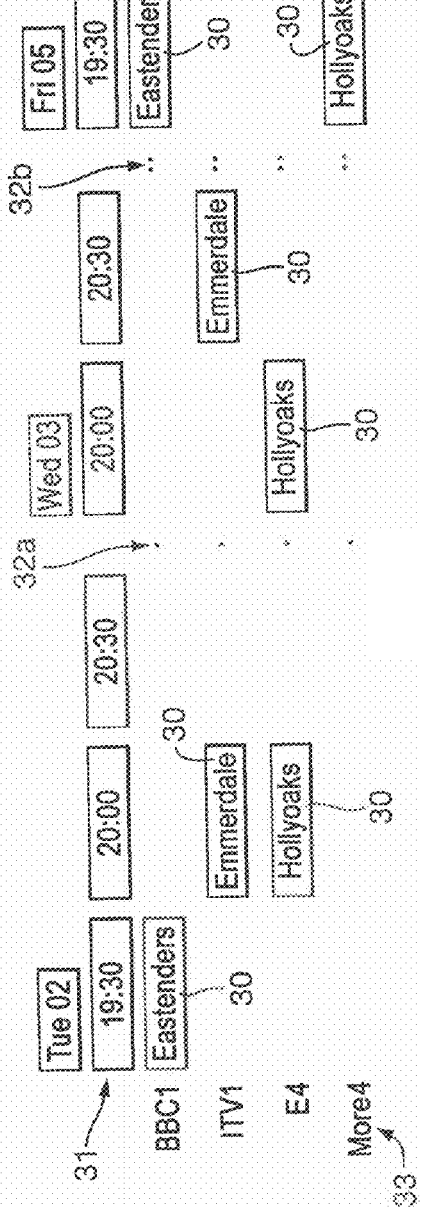
FIG. 4 is a picture of a displayed, filtered electronic program guide.

An example of the filtered EPG as displayed is shown in FIG. 4. In this example, the criteria used is to select programs which are soap operas. The format of the EPG is basically the same as that shown in FIG. 3 except that blocks 30 are only included for programs which are selected as being soap operas. Thus there are no blocks 30 at times when the program is not a soap opera, eg on Tuesday 02 on BBC 1 from 20:00 to 21:00.

Channels in which there are no selected programs are not displayed. Thus, in the example of FIG. 4, the final channel "Film 4" of FIG. 3 is not included because that channel includes no soap operas, being a movie channel.

Furthermore, the time axis represented by the scale 31 has discontinuities present at times when there is no selected program across all displayed channels. The discontinuities in time are represented by graphical symbols 32 arranged between the blocks 30 representing the programs. In the example of FIG. 4, there is are discontinuities between Tuesday 02, 21:00 and Wednesday 03, 20:00 and between Wednesday 03, 21:00 and Friday 05, 19:30.

Furthermore, the graphical symbols 32 are different according to the period of the discontinuity. The differing graphical symbols 32 allows the user to identify the periods of the discontinuities. In this example, the graphical symbols 32 are different in pattern. Thus, the graphical symbols 32a representing a discontinuity of one day each consist of one dot and the graphical symbols 32b representing a discontinuity of two days each consist of two dots. In general, the graphical symbols 32 could take any suitable form allowing the discontinuities to be identified and the period of the discontinuities to be distinguished. Some further examples are described below.

The particular form of the displayed EPG assists the user in appreciating the nature of the selected programs. The two-dimensional representation of the recordings allows the user to better appreciate precisely what programs have been selected. In particular, the channel and recording time are immediately apparent to the user, which in turn allows the user to understand the nature of the programs more rapidly and more accurately. The display of discontinuities in time, especially in a manner that allows the user to identify the period of the discontinuity, also assists the user in recognising the nature of the selected programs. For example, this assists in recognition of a series of related recordings. As an example of this, in FIG. 2 it is easy for the user to recognise that the recordings on the channel labelled "BBC 1" are a series of episodes of the same program (event). Furthermore, as the period of the discontinuity can be identified, the labelling of the time axis can be reduced, further simplifying the displayed EPG, for example by reducing the amount of information displayed in the scale 31 or by omitting the scale 31 altogether.

As another part of the user interface, the controller 14 maintains a recording list of recordings which are scheduled to be recorded in the future and a recoding list of recordings which have already been recorded. Data representing the recording lists is stored in the memory 15 and/or the recording unit 3. The data identifies all the recordings in the recording lists. The recordings are typically individual events (programs), for example if generated from the EPG, but in general the recording could cover part of an event or plural events.

The data representing the recording lists also includes metadata in respect of each recording. The metadata comprises various types of information about the recording, including but not restricted to the following. The metadata represents the service (channel) from which the recording is scheduled to be made, or was made. The metadata also represents the recording time at which the recording is scheduled to be made, or was made, for example by indicating the start time and end time of the recording.

The controller 14 controls the recording apparatus 1 to make recordings in accordance with the recording list of recordings which are scheduled to be recorded. In particular at the recording time specified by the metadata, the controller 14 causes the receiver-decoder circuit 2 to receive and decode the service (channel) specified by the metadata and causes the recording unit 3 to record the television signal output by the receiver-decoder circuit 2.

In response to a user-input from the remote commander 17 selecting the display of the recording lists, the controller 14 controls the graphics generator 19 to generate a video signal representing the recording lists from the stored data, as a type of user interface screen, in a similar manner to the EPG. The controller 14 allows the user to navigate the recording lists and to make user-inputs for control of the recording apparatus 1. When the recording list of programs scheduled to be recorded is displayed, the controller 14 accepts user-inputs indicating changes and in response thereto changes that recording list. Similarly, when the recording list of recordings which have already been recorded is displayed, the controller 14 accepts user-inputs selecting individual recordings and in response thereto controls the operation of the recording apparatus 1 to reproduce the selected recording from the recording unit 3.

Figure 2:
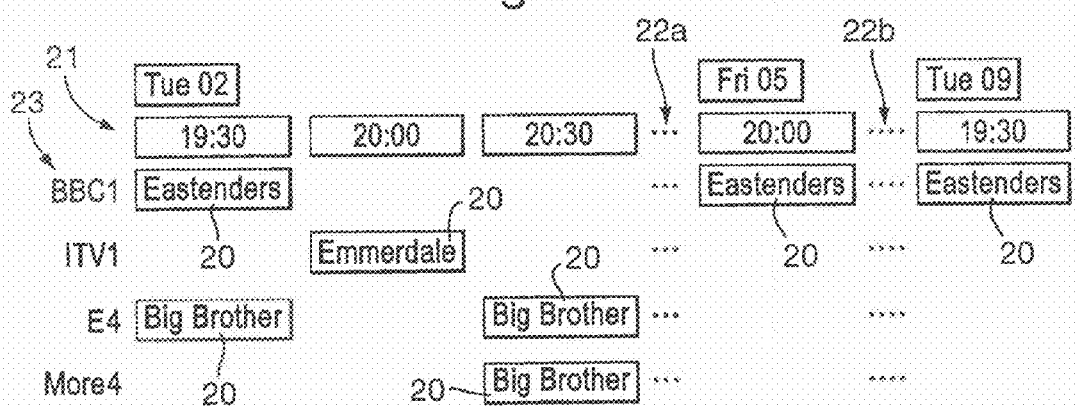
FIG. 2 is a picture of a displayed recording list generated by the recording apparatus.

The form of the recording lists as displayed is now described with reference to FIG. 2 which shows an example of a displayed recording list in the case of a recording apparatus 1 having plural receiver-decoder circuits allowing plural services (channels) to be simultaneously received and recorded. The recording list shown in FIG. 2 may be a list of recordings which are scheduled to be recorded in the future or a list of recordings which have already been made.

The recording list is displayed graphically. The individual recordings are represented by rectangular blocks 20, although in general any other graphical object could be used. The blocks contain the name of the recording, which may be the name of a program contained in the recording, for example taken from the EPG. The blocks 20 are arranged in two dimensions.

In a first dimension (horizontally in FIG. 2), the blocks 20 are ordered on the basis of the recording times of the recording represented thereby. The time axis is indicated by a scale 21 displayed graphically along the top of the display. In this example the scale 21 specifies the date and specifies the time in half-hourly chunks, but in general the time axis could be displayed in any suitable manner.

Furthermore, the time axis represented by the scale 21 has discontinuities. The discontinuities in time are represented by graphical symbols 22 arranged between the blocks 20 representing the recordings. Thus the discontinuities are present at times when there is no recording in the recording list. In the example of FIG. 2, there is are discontinuities between Tuesday 02, 21:00 and Friday 05, 20:00 and between Friday 05, 20:30 and Tuesday 09, 19:30.

Furthermore, the graphical symbols 22 are different according to the period of the discontinuity. The differing graphical symbols 22 allows the user to identify the periods of the discontinuities. In this example, the graphical symbols 22 are different in pattern. Thus, the graphical symbols 22a representing a discontinuity of three days each consist of three dots and the graphical symbols 22b representing a discontinuity of four days each consist of four dots. In general, the graphical symbols 22 could take any suitable form allowing the discontinuities to be identified and the period of the discontinuities to be distinguished. Some further examples are described below.

In a second dimension (vertically in FIG. 2), the blocks 20 are ordered on the basis of the channel of the recording represented thereby. The channels are identified by display of the names 23 of each channel.

When generating the video signal for display, the controller 14 takes the recording time and channel from the metadata stored in respect of the individual programs and generates the blocks 20 in appropriate positions on the basis of that metadata.

The particular form of the displayed recording list assists the user in appreciating the nature of the recordings contained in the recording lists. The two-dimensional representation of the recordings allows the user to better appreciate precisely what recordings have been made or are scheduled for recording. In particular, the channel and recording time are immediately apparent to the user, which in turn allows the user to understand the nature of the recordings more rapidly and more accurately. The display of discontinuities in time, especially in a manner that allows the user to identify the period of the discontinuity, also assists the user in recognising the nature of the recordings. For example this assists in recognition of a series of related recordings. As an example of this, in FIG. 2 it is easy for the user to recognise that the recordings on the channel labelled "BBC 1" are a series of episodes of the same program (event). Furthermore, as the period of the discontinuity can be identified, the labelling of the time axis can be reduced, further simplifying the recording list, for example by reducing the amount of information displayed in the scale 21 or by omitting the scale 21 altogether.

In the case of the recording list of recordings which have already been made, these advantages improve the operation of the recording apparatus 1 because the user is better able to identify a program desired to be reproduced. As the recording apparatus 1 uses a high capacity recording unit 3 such as a hard disk drives, a large number of recordings can be made of which the user might not have a complete knowledge and so there is a risk that a user cannot identify a recording which otherwise would be desired.

In the case of the recording list of recordings which are scheduled to be made, these advantages improve the operation by allowing the user to better manage the recording of multiple recordings. As the recording apparatus 1 uses a high capacity recording unit 3 such as a hard disk drives, a large number of recordings can be made
and being able to manage the scheduling of recordings improves the usability of the recording apparatus 1.

Although the recording apparatus 1 uses signals in accordance with the DVB standard, the invention could equally be applied to alternative standards, such as the ARIB standard (for example, in Japan), or the ATSC standard (for example, in the United States).

Although the recording apparatus 1 is arranged to receive a terrestrial radio frequency television broadcast signal, it may be modified to receive any type of broadcast television signal. It may receive a satellite broadcast signal. It may receive a television signal delivered over a cable, commonly referred to as cable-TV. In this case the recording apparatus 1 has basically the same structure as shown in FIG. 1 except that the connection to the external antenna 3 is replaced by a connection to the cable. Another alternative is a television signal delivered over a network which may be a wired network such as the internet or a LAN or may be a wireless network. For example in the case of delivery over the internet, the television signals may be IPTV (Internet Protocol television). In this case the recording apparatus 1 has basically the same structure as shown in FIG. 1 except that the receiver circuit 4 is replaced by a network interface arranged to receive data from the data network and to extract a video stream therefrom.

There will now be described alternative forms of graphical symbols representing discontinuities in time. Any of these may be used as an alternative to the graphical symbols 32 in the displayed EPG, or as an alternative to the graphical symbols 22 in the recordings list.

Figure 5:
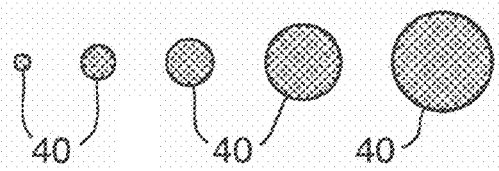
FIGS. 5 to 7 are drawings of graphical symbols that may be displayed.

A first alternative is to use graphical symbols that are different in size. FIG. 5 illustrates graphical symbols 40 which are an example of this in that the graphical symbols 40 are the same shape, in this case a dot, but of five different sizes. Each size of the graphical symbols 40 represents a discontinuity of a different period, for example: less than 24 hours, 1 day, 2-3 days, 4-7 days and more than a week, respectively.

Figure 6:
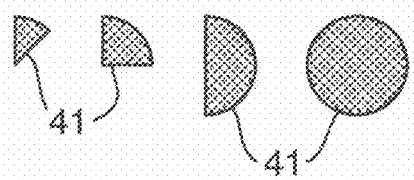

A second alternative is to use graphical symbols that are different in shape. FIG. 6 illustrates graphical symbols 41 which are an example of this in that the graphical symbols 41 are of different shapes, in this case being an eighth, a quarter, a half and a complete circle, respectively. Each shape of the graphical symbols 41 represents a discontinuity of a different period, for example: less than 24 hours, 1-2 days, 3-7 days and more than a week, respectively.

A third alternative is to use graphical symbols that are different in colour. By way of example, different colours may be used to represent discontinuities of a different periods in accordance with the following table:

| Colour | Period |
|---|---|
| Red | less than 1 hour |
| Orange | 1 to 2 hours |
| Yellow | 2 to 4 hours |
| Green | 4 to 8 hours |
| Blue | 8 to 12 hours |
| Indigo | 12 to 24 hours |
| Violet | 1 to 2 days |
| White | 2 days to 1 week |
| Black | 1 to 2 weeks |
| Cyan | 2 weeks to 1 month |
| Magenta | more than 1 month |

Figure 7:
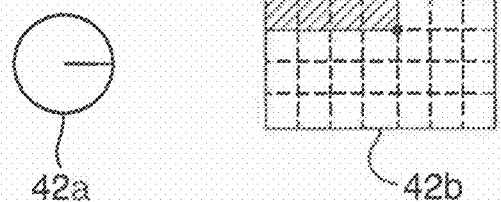

A fourth alternative is to use graphical symbols that are different in pattern in some other manner than the graphical symbols 22 and 32. FIG. 7 illustrates graphical symbols 42 which are an example of this in that the graphical symbols 42 are either a graphical symbol 42a that is a clock for discontinuities of less than 12 hours in which an hour hand indicates the period of the discontinuity in hours (a period of three hours being illustrated as an example in FIG. 7) or a graphical symbol 42b that is a calendar in which shading indicates the period of the discontinuity in days (four days being illustrated as an example in FIG. 7).

A fifth alternative is to use graphical symbols that are different in any combination of pattern, size, shape and colour.

In all alternatives, a key or legend may be displayed to indicate the periods represented by the different graphical symbols.

The invention claimed is:

1. A television signal recording apparatus comprising:
a recording unit capable of making recordings of television signals, the television signal recording apparatus being arranged to store metadata representing information in respect of the recordings including a channel from which a recording was made and a recording time at which the recording was made; and
a recordings display generator arranged to generate a signal for display on a display device of a graphical display of the recordings, the graphical display comprising graphical objects representing respective recordings and arranged in two dimensions, the graphical objects being ordered in a first dimension on a basis of channels represented by the metadata in respect of the respective recordings and ordered in a second dimension on a basis of recording times represented by the metadata in respect of the respective recordings, along a time axis which includes discontinuities at times when no recording has been made, the discontinuities being graphically represented,
wherein the discontinuities are graphically represented by a graphical symbol positioned between the graphical objects representing respective recordings, and
wherein said graphical symbols are different according to a period of discontinuity.

2. A television signal recording apparatus according to claim 1, wherein said graphical symbols are different in any combination of: colour, shape, size or pattern.

3. A television signal recording apparatus according to claim 1, further comprising a receiver-decoder circuit capable of receiving and decoding the television signals.

4. A television signal recording apparatus according to claim 1, further comprising a display device, the recordings display generator being arranged to supply said signal for display of a graphical display of the recordings to the display device.

5. A television signal recording apparatus according to claim 1, further comprising a video output interface for outputting a video signal, the recordings display generator being arranged to supply said signal for display of a graphical display of the recordings to the video output interface.

6. A method of operating a television signal recording apparatus including a recording unit capable of making recordings of television signals, the television signal recording apparatus being arranged to store metadata representing information in respect of the recordings including a channel from which a recording was made and a recording time at which the recording was made,
the method comprising generating a signal for display on a display device of a graphical display of the recordings, the graphical display comprising graphical objects representing respective recordings and arranged in two dimensions, the graphical objects being ordered in a first dimension on a basis of channels represented by the metadata in respect of the respective recordings and ordered in a second dimension on a basis of recording times represented by the metadata in respect of the respective recordings, along a time axis which includes discontinuities at times when no recording has been made, the discontinuities being graphically represented,
wherein the discontinuities are graphically represented by a graphical symbol positioned between graphical objects representing respective recordings, and
wherein said graphical symbols are different according to a period of discontinuity.

7. A method according to claim 6, wherein said graphical symbols are different in any combination of: colour, shape, size or pattern.

8. A television signal recording apparatus comprising:
a recording unit capable of making recordings of television signals;
a recordings controller arranged to maintain a list of scheduled recordings scheduled to be recorded at respective times and to operate the recording unit to record the recordings at the scheduled times; and
a recordings display generator arranged to generate a signal for display on a display device of a graphical display of the scheduled recordings, the graphical display comprising graphical objects representing respective scheduled recordings and arranged, on a basis of their respective times, along a time axis which includes discontinuities at times when no recording is scheduled to be made, the discontinuities being graphically represented,
wherein the discontinuities are graphically represented by a graphical symbol positioned between graphical objects representing respective recordings, and
wherein said graphical symbols are different according to a period of discontinuity.

9. A television signal recording apparatus according to claim 8, wherein said graphical symbols are different in any combination of: colour, shape, size or pattern.

10. A television signal recording apparatus according to claim 8, wherein the television signal recording apparatus is arranged to store metadata representing information in respect of the recordings made by the recording unit including a recording time at which a recording was made, and the recordings display generator is further arranged to generate a signal for display on a display device of a graphical display of the recordings made by the recordings unit, the graphical display comprising graphical objects representing respective scheduled recordings and arranged, on a basis of their respective times, along a time axis which includes discontinuities at times when no recording has been made, the discontinuities being graphically represented.

11. A television signal recording apparatus according to claim 8, wherein
the recordings controller is arranged to maintain the list of scheduled recordings scheduled to be recorded from respective channels at respective times and to operate the recording unit to record the recordings from scheduled channels at the scheduled times, and
in the graphical display, the graphical objects are arranged in two dimensions with a time axis extending in a first dimension and the graphical objects being ordered in a second dimension on a basis of the scheduled channels.

12. A television signal recording apparatus according to claim 8, further comprising a receiver-decoder circuit capable of receiving and decoding the television signals.

13. A television signal recording apparatus according to claim 8, further comprising a display device, the recordings display generator being arranged to supply said signal for display of a graphical display of the recordings to the display device.

14. A television signal recording apparatus according to claim 8, further comprising a video output interface for outputting a video signal, the recordings display generator being arranged to supply said signal for display of a graphical display of the recordings to the video output interface.

15. A method of operating a television signal recording apparatus including a recording unit capable of making recordings of television signals, the method comprising:
maintaining a list of scheduled recordings scheduled to be recorded at respective times and operating the recording unit to record the recordings at the scheduled times; and
generating a signal for display on a display device of a graphical display of the scheduled recordings, the graphical display comprising graphical objects representing respective scheduled recordings and arranged, on a basis of their respective times, along a time axis which includes discontinuities at times when no recording is scheduled to be made, the discontinuities being graphically represented,
wherein the discontinuities are graphically represented by a graphical symbol positioned between graphical objects representing respective recordings, and
wherein said graphical symbols are different according to a period of discontinuity.

16. A method according to claim 15, wherein said graphical symbols are different in any combination of: colour, shape, size or pattern.

17. A method according to claim 15, wherein
the television signal recording apparatus is arranged to store metadata representing information in respect of the recordings made by the recording unit including a recording time at which a recording was made, and
the method further comprises generating a signal for display on a display device of a graphical display of the recordings made by the recordings unit, the graphical display comprising graphical objects representing respective scheduled recordings and arranged, on a basis of their respective times, along a time axis which includes discontinuities at times when no recording has been made, the discontinuities being graphically represented.

18. A method according to claim 15, comprising maintaining a list of scheduled recordings scheduled to be recorded from respective channels at respective times and to operate the recording unit to record the recordings from scheduled channels at the scheduled times, and
wherein, in the graphical display, the graphical objects are arranged in two dimensions with a time axis extending in a first dimension and the graphical objects being ordered in a second dimension on a basis of the scheduled channels.

19. A receiver-decoder apparatus comprising:
a receiver-decoder circuit capable of receiving and decoding broadcast television signals of different services to generate therefrom a video signal for display of an image on a display device; and
an EPG generator operative to extract signalling data from a broadcast television signal received by the receiver-decoder circuit, the signalling data indicating programs scheduled to be broadcast,
the EPG generator being operative to filter the programs scheduled to be broadcast to select programs meeting a predetermined criteria and to generate a signal for display on said display device of an electronic program guide comprising graphical objects representing selected programs arranged along a time axis which includes discontinuities at times when no selected program is scheduled to be broadcast, the discontinuities being graphically represented, the discontinuities being graphically represented by a graphical symbol positioned between graphical objects representing respective recordings, said graphical symbols being different according to a period of discontinuity.

20. A method according to claim 19, wherein said graphical symbols are different in any combination of: colour, shape, size or pattern.

21. A receiver-decoder apparatus according to claim 19, wherein, in the electronic program guide, the graphical objects are arranged in two dimensions with a time axis extending in a first dimension and the graphical objects being ordered in a second dimension on a basis of channels on which the selected programs are scheduled to be recorded.

22. A receiver-decoder apparatus according to claim 21, wherein, in the electronic program guide, channels in which no selected programs are scheduled to be recorded are not included.

23. A receiver-decoder apparatus according to claim 21, wherein said electronic program guide only includes a set of one or more predetermined channels.

24. A receiver-decoder apparatus according to claim 19, wherein said predetermined criteria is defined by user-input.

25. A receiver-decoder apparatus according to claim 19, wherein said predetermined criteria is whether a program falls in a particular genre or category.

26. A receiver-decoder apparatus according to claim 19, further comprising a recording unit capable of making recordings of television signals.

27. A receiver-decoder apparatus according to claim 19, further comprising a display device, the EPG generator being arranged to supply the signal for display of an electronic program guide to the display device.

28. A receiver-decoder apparatus according to claim 19, further comprising a video output interface for outputting a video signal, the EPG generator being arranged to supply the signal for display of an electronic program guide to the video output interface.

29. A method of operating a receiver-decoder apparatus which comprises a receiver-decoder circuit capable of receiving and decoding broadcast television signals of different services to generate therefrom a video signal for display of an image on a display device, the method comprising extracting signalling data from a broadcast television signal received by the receiver-decoder circuit, the signalling data indicating programs scheduled to be broadcast, filtering the programs scheduled to be broadcast to select programs meeting a predetermined criteria, and generating a signal for display on said display device of an electronic program guide comprising graphical objects representing selected programs arranged along a time axis which includes discontinuities at times when no selected program is scheduled to be broadcast, the discontinuities being graphically represented by a graphical symbol positioned between graphical objects representing respective recordings, said graphical symbols being different according to a period of discontinuity.

30. A method according to claim 29, wherein said graphical symbols are different in any combination of: colour, shape, size or pattern.

31. A method according to claim 29, wherein in the electronic program guide, the graphical objects are arranged in two dimensions with a time axis extending in a first dimension and the graphical objects being ordered in a second dimension on a basis of channels on which the programs are scheduled to be recorded.

32. A method according to claim 31, wherein, in the electronic program guide, channels in which no selected programs are scheduled to be recorded are not included.

33. A method according to claim 31, wherein said electronic program guide only includes a set of one or more predetermined channels.

34. A method according to claim 29, wherein said predetermined criteria is defined by user-input.

35. A method according to claim 29, wherein said predetermined criteria is whether a program falls in a particular genre or category.

36. A method according to claim 29, further comprising supplying the signal for display of an electronic program guide to the display device.

* * * * *